April 19, 1960   S. ARZOIAN   2,932,899
DIRECT READING VERNIER HEIGHT GAGE
Filed May 23, 1957   2 Sheets-Sheet 1
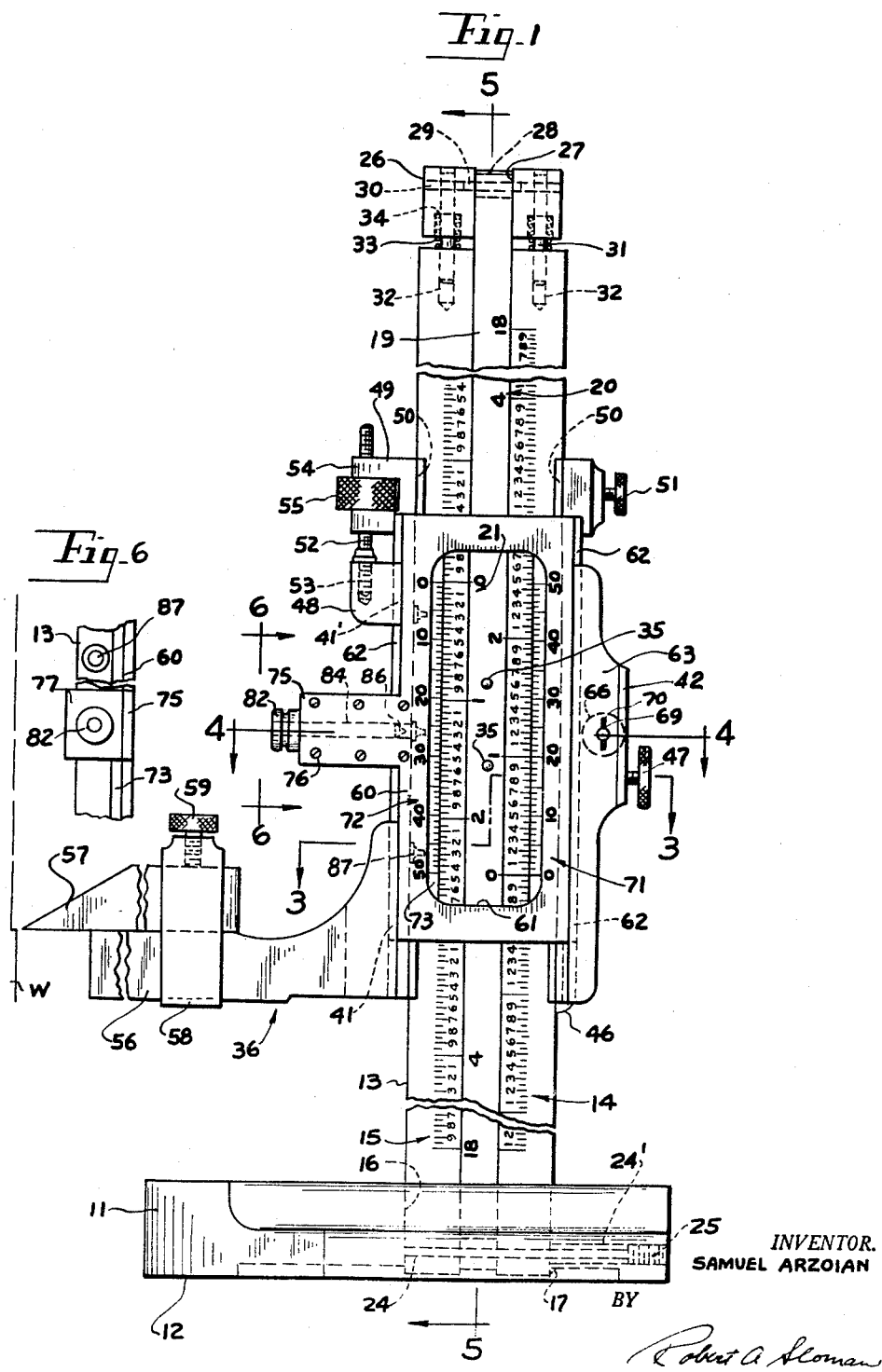
INVENTOR.
SAMUEL ARZOIAN
BY
Robert A. Sloman
ATTORNEY

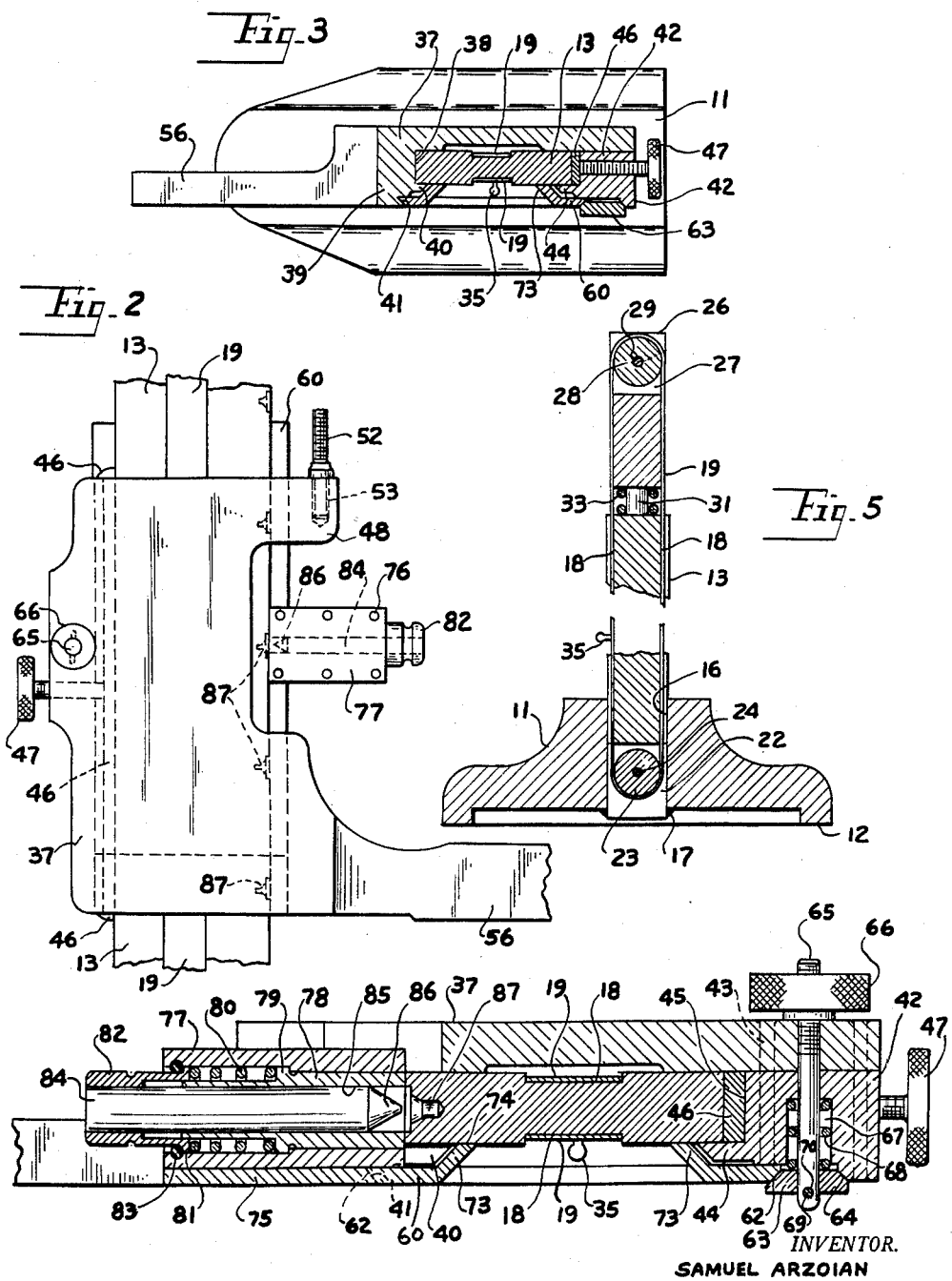

United States Patent Office 2,932,899
Patented Apr. 19, 1960

2,932,899

DIRECT READING VERNIER HEIGHT GAGE

Samuel Arzoian, Detroit, Mich.

Application May 23, 1957, Serial No. 661,059

6 Claims. (Cl. 33—169)

This invention relates to the use of the vernier form of measuring, and more particularly to a novel form of height gauge construction, which has for its primary object a complete simplification in the reading and setting thereof for pre-determined measured distances.

In comparison with modern prevailing means of measuring and inspecting, using standard blocks, securely set and sized gauges, electrical and dial gauges, the present height gauges in use can no longer be considered precision instruments. They are rather a versatile intermediary between cautious scale measuring and precision inspection, such as with working standard blocks, or the superior master standard blocks.

Thus, while the height gauge is regarded in industry as an inferior precision instrument, it is indispensible because of its versatility.

The present novel height gauge is especially designed to give full emphasis to versatility, ease of operation and increased accuracy. The present invention may be applied to many or all vernier measuring instruments, such as vernier calipers, protractors, or vernier instruments used in other skills.

The primary object of this invention is to take a clean start such as from the end of a ruler in measuring, and feel free to accurately measure in either up or down direction without limit. The invention has achieved this objective and measurements are unlimited within the total working length of the instrument with perfect ease to the operator.

Regardless of where the scribing or indicating element may be situated on the total working length of the height gauge, without moving the said element, the measuring means may be shifted to a zero beginning and the operator may proceed to take as large a series of measurements in either direction as desired from the zero start. Then without losing track he may accurately measure to the next point; shift to start, and repeat a new series of measurements.

Heretofore various types of height gauges have been so constructed that in making plus or minus adjustments of the measuring element, it became inevitable to add or subtract from the set reading on the graduations in the amount of adjustment desired. This entailed paper work, delay, and the possibility of error.

The present invention has for one object the provision of a novel structure which incorporates a vertically adjustable vernier plate and tape, and a vertically calibrated upright bar whereby direct readings or settings may be obtained of predetermined dimensions in up or down directions from any point throughout the total working length of the instrument, and wherein the difficult procedure of adding and subtracting in either direction is completely eliminated.

These and other objects will be seen from the following specification and claims in conjunction with the appended drawings in which:

Fig. 1 is a fragmentary front elevational view of the present height gauge.

Fig. 2 is a fragmentary rear elevational view of a portion of the gauge.

Fig. 3 is a section taken on line 3—3 of Fig. 1.

Fig. 4 is a section taken on line 4—4 of Fig. 1.

Fig. 5 is a fragmentary vertical section taken on line 5—5 of Fig. 1.

Fig. 6 is a fragmentary elevational view taken on line 6—6 of Fig. 1.

It will be understood that the above drawings illustrate merely one preferred embodiment of the invention and that other embodiments are contemplated within the scope of the claims hereafter set forth.

Referring to the drawings, the present height gauge includes the base 11 having the perfectly flat undersurface portions 12 adapted for positioning upon a flat surface. The upright bar 13 with one set of calibrations 14 extending upwardly and laterally spaced therefrom a second set of calibrations 15 extending downwardly, is snugly projected through the aperture 16 in said base and secured thereto by the welds 17, Fig. 5.

Opposing central portions on opposite sides of upright bar 13 are slotted at 18 to slidably receive the continuous movable tape 19. This tape, in the preferred embodiment of the invention, has one set of continuous one-inch spaced numerals 20, which extend in one direction of the length of said tape adjacent one margin thereof, and second set of one inch spaced marginal numerals 21 extending in the opposite direction throughout the length of the tape.

As shown in Fig. 5, the lower end of bar 13 has a central upright slot 22 within which is journaled tape support roller 23. Pin 24 extends loosely through slot 24' in base 11 and through lower end portions of bar 13, loosely journals roller 23 within slot 22. Removable set screw 25 in slot 24' retains said pin in position.

A separate expansion member 26 is movably positioned upon the upper end of bar 13, and includes a central slot 27, which loosely receives the upper tape supporting roller 28 journaled upon the transverse pin 29. A corresponding transverse hole 30 is drilled through member 26 to provide access to said roller supporting pin.

The upper ends of upright guide pins 31 are pressed into member 26 and extend downwardly therefrom and are slidable within corresponding upright apertures 32 in the end of bar 13, for guiding vertical movements of member 26.

Counterbores 34 in member 26 receive the compressed springs 33 which rest on bar 13 normally urging member 26 upwardly.

Outwardly projecting knobs 35 are joined to a center portion of tape 19 to facilitate longitudinal manual adjustment thereof as desired.

A conventional type of scriber supporting block 36 is shown slidably mounted upon bar 13, and includes the upright backing plate 37, Figs. 2 and 3 which has an upright slot 38 upon one side and the bounding forward extension 39 with the inward projection 40.

Slot 38 cooperatively receives one side of upright bar 13. The front face of extension 39 also has formed therein the upright tapered guideway 41 adapted to receive one edge of vertically adjustable vernier plate 60.

Upon the opposite side of back plate 37 there is positioned upright elongated block 42, which is secured to its front face by a series of dowels 43 or other fasteners.

Inwardly directed upright ledge 44 extends loosely over the front face of bar 13 defining with back plate 37 the upright slot 45 shown in Fig. 4 which cooperatively receives the opposite upright edge of bar 13, there being interposed in said slot the elongated formed leaf spring 46 as shown in Fig. 2.

Clamp screw 47 is threaded through block 42 with its inner end operatively and frictionally engaging leaf spring 46 for securing block 36 in any desired position of vertical adjustment upon bar 13.

Laterally extending arm 48 projects from the upper end of back plate 37. A fine adjustment block 49 is slidably positioned over bar 13 spaced above block 36, and includes the forward extensions 50 which retainingly engage the front wall of bar 13. Clamp screw 51 extends laterally inward from one end of block 49 and is adapted to frictionally engage the edge of bar 13 for securing block 49 in any desired position of adjustment with respect to bar 13.

Upright screw 52 anchored at 53 within block arm 48 extends upwardly and loosely through the laterally extending bifurcations 54 in block 49, and thereabove. Knurled nut 55 is loosely positioned within said bifurcations and threadedly engages screw 52 whereby with block 49 secured in position, a fine vertical adjustment of block 36 may be effected in a conventional manner.

Block 36, Fig. 1 includes the horizontally disposed arm 56 upon which is mounted the laterally extending scriber 57, which is arranged with respect to the work W, fragmentarily indicated in dotted lines. This scriber is adjustably secured in position on arm 56 by a conventional saddle 58 and clamp screw 59.

As shown in Fig. 1, there is mounted upon the front open face of block 36 the vertically adjustable vernier plate 60, whose center portion is cut away at 61 to provide visual access to the calibrations 14, 15, 20 and 21.

The upright marginal edges of plate 60 are rearwardly and outwardly tapered at 62. One such edge projects within the tapered groove 41 shown in Fig. 4, which forms a part of back plate extension 39. The opposite upright tapered edge 62 is cooperatively and guidedly received within the inwardly and rearwardly tapered upright edge of elongated wedge 63. Said wedge upon its opposite upright tapered rear surface is cooperatively nested upon the upright tapered edge 64 in the front face of block 42.

Bolt 65 projects rearwardly through a central portion of wedge 63 and is secured against rotation with respect thereto by the upright locking means, such as the cotter pin 69, which extends through said bolt and nests within the upright groove 70 formed in the front face of said wedge.

Knurled adjusting nut 66 is threaded on bolt 65 and operatively engages the rear surface of backing plate 37 for effectively retaining wedge 63 tightly against the upright guide edge 62 of vernier plate 60.

Coiled spring 68 loosely surrounds bolt 65 and is nested within the bore 67 upon the front side of block 42 with the free end of the spring operatively engaging wedge 63. Accordingly when nut 66 is loosened there is a slight outward positioning of wedge 63 with respect to block 42 to permit vertical sliding adjustment of vernier plate 60, after which nut 66 is tightened for securing the vernier plate in position and with respect to block 36.

The front face of vernier plate 60 upon one of its inner upright margins has formed the upwardly extending vernier scale 71 which, for illustration, has fifty divisions, with each division spaced apart a distance of .049". Upon the opposite inner margin of said plate there is provided a second vernier scale 72, which starts at the upper end of said plate and extends downwardly. The corresponding calibrations of the respective scales are accurately formed upon the inwardly converged extensions 73 whose flat upright edges 74 cooperatively engage the front surface of bar 13. This places said calibrations adjacent calibrations 14 and 15 for easy vernier reading. In the present preferred embodiment, the divisions of the bar calibrations are ½₀ inch apart, or .050 inch. In the present preferred embodiment calibration 14 extends upwardly for 18 inches and similarly calibration 15 extends downwardly for 18 inches.

Intermediate the upper and lower ends of vernier plate 60 there is provided the lateral extension 75, Figs. 1 and 4, which by means of a series of screws or dowels 76 supports the horizontally disposed housing 77. Sleeve 78 is projected within the bore of housing 77 and immovably secured therein with its intermediate flange 79 serving as a retaining stop for coil spring 80 which surrounds a reduced portion of said sleeve. The horizontally disposed plunger cap 82 includes the forward annular flange 81 slidably positioned within the bore of housing 77 and operatively engages the outer end of spring 80. Lock ring 83 is nested within an outer portion of the bore of housing 77 and is adapted to limit the outward position of cap 82 under the action of spring 80. Elongated cylindrical pin 84 secured within plunger cap 82, loosely and slidably extends within the bore 85 of sleeve 78 and terminates in the forward conical end 86 adapted for manual projection within one of a series of vertically spaced apertures 87 formed within the marginal edge of bar 13.

*Operation*

In operation, the present height gauge is used by initially adjusting blocks 36 and 49 loosely upon bar 13 setting scriber 57 with respect to a predetermined reference point or line upon the work W, fragmentarily shown in Fig. 1, after which both of the set screws 47 and 51 are secured.

Now assuming the scriber is to be elevated to a certain distance, as for example 2.276" from the position shown. The first step is to loosen the vernier retaining nut 66 and adjust the vernier plate 60 vertically so that either of its zeros on the vernier scales approximately register with the nearest inch graduation on bar 13.

Thereafter the operator manually activates the plunger cap 82 inwardly projecting the conical end 86 of pin 84 so as to engage within the adjacent notch 87 in bar 13. This produces a slight but fine vertical adjustment of vernier plate 60 to guarantee that the zero readings on scales 71 and 72 exactly register with the inch lines on the upright bar, after which the knurled nut 66 is tightened.

Next using knobs 35 the tape 19 is vertically adjusted till the zero numerals of tape calibrations 20, 21 register with the zero calibrations of the vernier plate 60. Now the block 36 is in set position to take unlimited measurements upwardly or downwardly, throughout the full height of bar 13, to either extremity thereof, if necessary.

Next the screws 47 and 51 are loosened and the entire block 36 is manually elevated with respect to scale 14 until the zero on scale 71 substantially registers slightly above 2.25 inches on bar scale 14.

After this the top clamp screw is tightened. The block is given a fine adjustment by turning the knurled nut 55 until the vernier graduation 26 registers with the next nearest graduation on scale 14. Thus using the vernier in a conventional manner it is known that scriber 57 has been elevated exactly 2.276". Because of the two sets of scales 14 and 15 and the two vernier scales 71 and 72, it is seen that the present height gauge may be used for unlimited measurements upwardly as well as for measurements downwardly limited only by the extremities or working length of the bar. This process may be repeated from any point along the working length of the bar, whereon the scriber may be located.

From this explanation, once a reference point is established, and the vernier plate zeros and the tape zeros are brought into registration with the nearest inch graduations on upright bar scales 14 and 15, the operator has complete freedom to take all sorts of measurements to and within either extremity of the height gauge from the aforementioned reference point.

Upon completion of this last measurement, without moving the scriber, the vernier plate zeros and the tape zeros may again be brought into registration with the nearest inch graduations on the bar scales. This provides a new point for a new series of measurements.

Having described my invention, reference should now be had to the following claims:

1. In a vernier height gauge having a base mountable on a horizontal surface, an upright bar joined to and projecting above said base, there being a pair of fixed parallel spaced sets of graduations on said bar along its length, one reading upwardly and the other downwardly, a vertically adjustable block slidably mounted on and along said bar and carrying a horizontally disposed scriber, an upright vernier scale plate spanning said block and bar graduations slidably supported within and upon said block and having a central transverse elongated opening exposing said graduations, and spaced sets of graduations along its internal margins parallel to and in cooperating adjacent relation with the respective sets of bar graduations, there being a series of vertically spaced tapered identations in one side edge of said bar, a lateral extension on said vernier plate, a housing mounted on said extension and having a horizontally disposed bore registerable with said indentations, the centers of said indentations having a predetermined defined relation with the inch markings of said bar calibrations, and a plunger pin movably mounted in said bore normally biased outwardly and adapted on manual inward projection into one of said indentations to effect slight camming vertical adjustment of said vernier plate relative to said block for accurately registering the zero readings of both sets of vernier calibrations with the nearest inch graduations of said bar calibrations, and clamping means for securing said plate upon said block.

2. In a vernier height gauge having a base mountable on a horizontal surface, an upright bar joined to and projecting above said base, there being a pair of fixed parallel spaced sets of graduations on said bar along its length, one reading upwardly and the other downwardly, a vertically adjustable block slidably mounted on and along said bar and carrying a horizontally disposed scriber, an upright vernier scale plate spanning said block and bar graduations slidably supported within and upon said block and having a central transverse elongated opening exposing said graduations, and spaced sets of graduations along its internal margins parallel to and in cooperating adjacent relation with the respective sets of bar graduations, there being a series of vertically spaced tapered indentations in one side edge of said bar, a lateral extension on said vernier plate, a housing mounted on said extension and having a horizontally disposed bore registerable with said indentations, the centers of said indentations having a predetermined defined relation with the inch markings of said bar calibrations, and a plunger pin movably mounted in said bore normally biased outwardly and adapted on manual inward projection into one of said indentations to effect slight camming vertical adjustment of said vernier plate relative to said block for accurately registering the zero readings of both sets of vernier calibrations with the nearest inch graduations on said bar, and clamping means for securing said plate upon and with respect to said block, the mounting of said pin including an elongated sleeve within said housing having an annular flange, a plunger cap secured on said pin and movable within said housing, and a coiled spring on said sleeve interposed between said flange and said cap normally urging said cap and pin outwardly.

3. In a direct reading vernier height gage having a base, an upright bar joined to and projecting above said base, there being a pair of fixed parallel spaced sets of graduations on said bar, each set running over its total length and numbered in tenth inch divisions, blank at full inch markings, one set reading upwardly and the other downwardly, a vertically adjustable block slidably mounted on and along said bar and carrying a horizontally disposed scriber, means to finely adjust and secure said block-scriber on said bar at any selected reference point throughout the length of said bar graduations, an adjustable upright vernier scale plate spanning said block and bar graduations, slidably supported within and upon the front of said block and having a central transverse elongated opening exposing said bar graduations, spaced sets of vernier graduations along the internal margins of said plate parallel to and in cooperating adjacent relation with the respective sets of bar graduations, said sets of vernier graduations progressively increasing in opposite directions from zeros located adjacent the top and bottom respectively of the vernier scale plate opening, said vernier zeros being adapted to provide simultaneous zero registration with any and all respective sets of inch markings of said bar graduations casting off residual excesses of the inch from previous measurements, clamping means for securing said vernier scale plate zeros in said registered position upon and in respect to said block-scriber at its secured position in respect to a reference point, rollers journaled on the upper and lower ends of said bar, a continuous tape supportably and movably mounted over said rollers and upon opposite sides of and throughout the length of said bar, said tape having a pair of parallel spaced sets of numerals at inch intervals thereon along its length, progressively increasing from adjacently spaced zeros simultaneously positionable within the vernier scale plate opening, one set reading upwardly and the other downwardly adjacent the respective sets of the blank inch markings of the bar graduations providing distinctive and progressively increasing varying numerical values to each respective set of said blank inch markings, said tape zeros being adapted to provide simultaneous registration in common with said registered and secured scale plate vernier zeros respectively at common inch markings of said bar graduations in respect to said block scriber at its secured position in respect to said reference point, providing, on release of said block-scriber, a simultaneous zero start for unlimited up and down direct measurement readings respectively from any selected reference point to any other point throughout the length of said bar graduations.

4. In the direct reading vernier height gage of claim 3, opposing margins of said vernier scale plate being tapered, there being an upright undercut tapered groove guide formed in the front of said scriber block on one side, the front tapered margin of said vernier scale plate being slidably and retainingly engaged within said guide positioning said vernier scale plate in one direction, a lateral extension on said vernier scale plate, a housing mounted on the rear of said lateral extension retainingly bearing against the adjacent upright side of said bar positioning said vernier scale plate in the opposing direction, said clamping means being adjustably secured upon the opposite side of said block and having an upright undercut guide surface adapted to retainingly receive the rear tapered margin of said vernier scale plate for securing said vernier scale plate in dual directions and its zeros in simultaneous registered position in respect to respective inch markings of said bar graduations upon and in respect to said block-scriber at its secured position in respect to a reference point.

5. In the direct reading vernier height gage of claim 1, rollers journalled upon the upper and lower ends of said bar, a continuous tape supportably and movably mounted over said rollers and upon opposite sides of and throughout the length of said bar, said tape having a pair of parallel spaced sets of numerals at inch intervals thereon along its length, progressively increasing from adjacently spaced zeros simultaneously positionable within the vernier scale plate opening, one set reading upwardly and the other downwardly adjacent the respective sets of the blank inch markings of the bar graduations, said tape zeros being adapted to provide simultaneous registration in common with said registered and secured scale plate vernier zeros respectively at common inch markings of said bar graduations.

6. In the direct reading vernier height gage of claim 3, a vertically adjustable fine adjustment saddle positioned above said scriber block, means to secure said saddle to said bar, and means to finely adjust and secure said block-scriber at any point throughout the length of said bar graduations as a selected reference point.

References Cited in the file of this patent

UNITED STATES PATENTS

| | | |
|---|---|---|
| 1,783,507 | Kapps | Dec. 2, 1930 |
| 2,544,004 | Bauer | Mar. 6, 1951 |
| 2,774,146 | McCoy | Dec. 18, 1956 |

FOREIGN PATENTS

| | | |
|---|---|---|
| 26,318 | Great Britain | Dec. 2, 1903 |
| 118,593 | Great Britain | Apr. 10, 1919 |
| 616,888 | Great Britain | Jan. 28, 1949 |